United States Patent Office 2,812,969
Patented Nov. 12, 1957

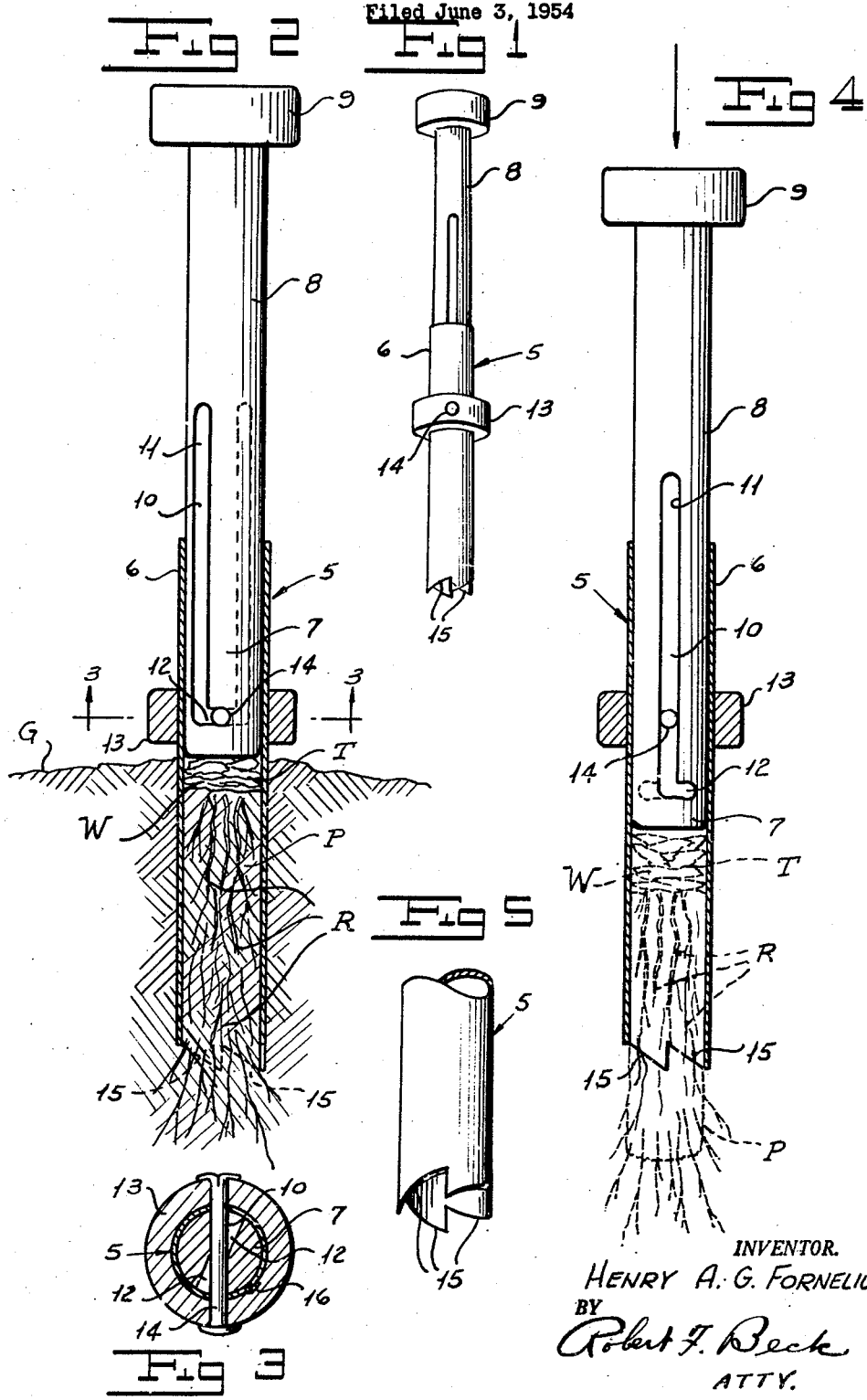

2,812,969

WEED EXTRACTORS

Henry A. G. Fornelius, Clifton, N. J., assignor of one-half to Axel F. Fornelius, Clifton, N. J.

Application June 3, 1954, Serial No. 434,171

1 Claim. (Cl. 294—50.7)

My invention relates to garden tools and more particularly to plant or weed extractors, examples of some prior art devices being disclosed in U. S. Patents Nos. 809,476 and 2,030,770.

One of the objects of my invention is to provide a weed extractor which is simple in construction, durable in use, efficient in operation, economical in manufacture and which functions to extract substantially the entire roots of a plant or weed from the ground to thereby preclude further growth of the weed.

With the above and other objects in view, as will hereinafter appear, the invention consists in the combinations and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a perspective view of my invention.

Figure 2 is a longitudinal sectional view of my invention with the handle in elevation and disclosing the casing inserted within the ground.

Figure 3 is a detail sectional view taken on the line 3—3 of Figure 2.

Figure 4 is a view similar to Figure 2 but illustrating the ejector in a lowered position during discharge of the plug from the casing.

Figure 5 is a detail perspective view of the lower end of the casing.

In practicing my invention, as illustrated in the drawing, I provide a cylindriform casing 5 which has axially, slidably and rotatably mounted in its upper portion 6 the cylindrical lower end section 7 of an operating rod or handle 8 having a hand grip 9 fixed to its upper end, the section 7 constituting an ejector for a purpose hereinafter made apparent. The lower end section 7 of the handle 8 is formed with and has extending therethrough a bayonet slot 10 having a relatively long run or portion 11 extending axially of the handle and a relatively short run or portion 12 communicating with the run 11 at its lower end and disposed in a plane substantially right-angular to the axis of the handle.

A ferrule or collar 13 is secured about the casing and has fixed thereto a pin or rivet 14 which extends through the collar, casing and the slot 10 for limiting axial and rotational movement of the handle 8 relative to the casing. The lower end of the casing is fashioned with a quaternary of ratchet-like teeth 15 which function to facilitate insertion of the casing within the ground G and subsequent cleavage of the soil.

In use, assuming the handle 8 and casing 5 are arranged in a manner to dispose the pin 14 within the closed end of the run 12 of the slot 10, the handle 8 is suitably gripped and forced downwardly to effect penetration of the lower portion of the casing 5 within the ground G and in a manner to encompass and receive the top T and roots R of a plant or weed W, the foot of the user being applied to the ferrule 13 to facilitate the insertion if desired. When the casing is thus inserted within the ground, it is rotated clockwise whereupon the teeth 15 function to cleave the soil to form a plug P of earth impacted within the casing and containing the roots and the top of the weed, the teeth serving to sever any root fibers which may extend laterally without the casing. When the soil is thus cleaved, the casing is withdrawn from the ground with the plug P therein, the latter serving to withdraw from the soil any relatively long fibers or the like. Upon withdrawal of the casing from the ground, the ferrule is gripped in one hand and the handle rotated counterclockwise by the other hand of the user to dispose the pin 14 in the lower end of the run 11 whereupon the handle is moved axially within the casing to effect ejecting of the plug P out of the casing by the section or ejector 7, the latter being limited in its movement towards the lower end of the casing by engagement of the pin 14 with the upper end of the run 11. When the plug has thus been ejected from the casing, the handle is axially moved in the opposite direction and rotated to dispose the pin within the closed end of the run 12 and thus condition the device for another plant or weed extracting operation.

From the foregoing, it will be apparent that I have provided a plant or weed extractor of an extremely simple construction and which may be constructed with a casing having a relatively small diameter whereupon a relatively small diameter hole is left within the ground after use for easy closing by the foot. The casing 5, which is preferably constructed from a suitable metal, is, in the present instance, formed from a blank with the teeth 15 stamped therefrom and the blank rolled and formed on one side margin with an offset lip 16 overlapping the margin of the other side with the lip being spot welded to the body of the casing, thus contributing materially to economy with respect to manufacture.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claim.

What I claim is:

A device for removing a plug of earth from the ground and comprising, a relatively narrow sheet constructed of metal and being transversely curved between its ends and with said ends being disposed in overlapped relation and welded together to form a cylinder constituting a casing adapted to be inserted into the ground to form said plug within said casing and to cleave the ground circumjacent the lower end of said plug to facilitate withdrawal of said plug with said casing, a handle extending into the upper end of said casing for movement therewith and relative thereto and being of an approximate uniform diameter throughout its length and constituting a plug-like ejector having a diameter substantially coincident with the inner diameter of said casing and with said ejector having a running fit with the inner peripheral face of said casing to permit axial movement relative thereto, said handle being formed with a slot having angularly related runs, a pin extending transversely through said casing and through one of said runs for maintaining said handle and said casing in fixed relation for said insertion and said withdrawal, said pin being shiftable to within another run for permitting relative axial movement of said ejector and said casing for ejecting said plug from said casing, the lower end of said casing being formed with teeth to facilitate said insertion and cleavage and to sever root fibers extending laterally from said plug.

References Cited in the file of this patent
UNITED STATES PATENTS

| | | |
|---|---|---|
| 370,810 | Newman | Oct. 4, 1887 |
| 750,888 | Pine | Feb. 2, 1904 |
| 2,583,214 | Hanzlik | Jan. 22, 1952 |